United States Patent
Bhaskar et al.

(10) Patent No.: US 11,851,068 B2
(45) Date of Patent: Dec. 26, 2023

(54) ENHANCED TARGET DETECTION

(71) Applicant: Ford Global Technologies, LLC, Dearborn, MI (US)

(72) Inventors: Sandhya Bhaskar, Blacksburg, VA (US); Nikita Jaipuria, Union City, CA (US); Jinesh Jain, Pacifica, CA (US); Vidya Nariyambut Murali, Sunnyvale, CA (US); Shreyasha Paudel, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 138 days.

(21) Appl. No.: 17/509,227

(22) Filed: Oct. 25, 2021

(65) Prior Publication Data

US 2023/0128947 A1 Apr. 27, 2023

(51) Int. Cl.
*B60W 40/04* (2006.01)
*G06T 7/50* (2017.01)
*G06T 7/20* (2017.01)
*B60W 30/09* (2012.01)

(52) U.S. Cl.
CPC ............ *B60W 40/04* (2013.01); *B60W 30/09* (2013.01); *G06T 7/20* (2013.01); *G06T 7/50* (2017.01); *B60W 2554/4042* (2020.02); *B60W 2554/4043* (2020.02); *B60W 2554/4044* (2020.02); *B60W 2554/4045* (2020.02); *B60W 2554/801* (2020.02); *B60W 2554/802* (2020.02); *B60W 2554/803* (2020.02); *B60W 2554/804* (2020.02); *G06T 2207/20081* (2013.01); *G06T 2207/20084* (2013.01); *G06T 2207/30261* (2013.01)

(58) Field of Classification Search
CPC ......... B60W 40/04; B60W 30/09; G06T 7/50; G06T 7/20
See application file for complete search history.

(56) References Cited

U.S. PATENT DOCUMENTS

| | | |
|---|---|---|
| 7,034,668 B2 | 4/2006 | Engleman et al. |
| 9,212,926 B2 | 12/2015 | Attard et al. |
| 9,610,996 B2 | 4/2017 | Neugebauer et al. |
| 9,988,046 B2 | 6/2018 | Tromblet et al. |
| 10,011,277 B2 | 7/2018 | Meinhart et al. |
| 10,232,849 B2 | 3/2019 | Liu et al. |

(Continued)

FOREIGN PATENT DOCUMENTS

| | | | | |
|---|---|---|---|---|
| CN | 110329249 A | 10/2019 | | |
| WO | WO-2019044645 A1 * | 3/2019 | ............ | B60W 10/18 |

OTHER PUBLICATIONS

Machine translation of WO-2019044645-A1 (Year: 2019).*

(Continued)

*Primary Examiner* — Hussein Elchanti
*Assistant Examiner* — Kenneth M Dunne
(74) *Attorney, Agent, or Firm* — Frank A. MacKenzie; Bejin Bieneman PLC

(57) ABSTRACT

Image data are input to a machine learning program. The machine learning program is trained with a virtual boundary model based on a distance between a host vehicle and a target object and a loss function based on a real-world physical model. An identification of a threat object is output from the machine learning program. A subsystem of the host vehicle is actuated based on the identification of the threat object.

20 Claims, 5 Drawing Sheets

(56) References Cited

U.S. PATENT DOCUMENTS

| | | |
|---|---|---|
| 10,266,175 B2 | 4/2019 | Miller et al. |
| 10,351,129 B2 | 7/2019 | Luo et al. |
| 10,403,145 B2 | 9/2019 | Deng et al. |
| 10,446,033 B2 | 10/2019 | Mills et al. |
| 10,503,174 B1 | 12/2019 | Kim et al. |
| 10,829,113 B2 | 11/2020 | Liu et al. |
| 10,872,531 B2 | 12/2020 | Liu et al. |
| 10,967,853 B2 | 4/2021 | Rayalsamy et al. |
| 2019/0232958 A1 | 8/2019 | Deng et al. |
| 2020/0010077 A1* | 1/2020 | Cormack ............ B60W 50/087 |
| 2020/0066158 A1 | 2/2020 | Park et al. |
| 2020/0216060 A1 | 7/2020 | Pontisakos et al. |
| 2020/0272164 A1* | 8/2020 | Gray .................... G06V 10/764 |
| 2021/0031772 A1 | 2/2021 | Gomora |
| 2021/0046927 A1 | 2/2021 | Miller et al. |
| 2021/0061241 A1 | 3/2021 | Liu et al. |
| 2021/0061266 A1 | 3/2021 | Ponisakos et al. |
| 2021/0114565 A1 | 4/2021 | Liu et al. |
| 2021/0139025 A1 | 5/2021 | Kim |

OTHER PUBLICATIONS

Bansal et al, "Risk Ranked Recall: Collision Safety Metric for Object Detection Systems in Autonomous Vehicles", Jun. 2021, IEEE (Year: 2021).*

Chen et al, "Multi-Task learning for Dangerous object detection in autonomous driving", 2018,Elsevier, Information Sciences 432 (Year: 2018).*

Feth et al, "Dynamic Risk Assessment for Vehicles of Higher Automation Levels by Deep Learning", Jun. 2018, arXiv (Year: 2018).*

Wang et al, "Collision Risk Rating of Traffic Scene from Dashboard Cameras", 2017, IEEE (Year: 2017).*

Chan, F., et al., "Anticipating Accidents in Dashcam Videos," Dept. of Electrical Engineering, National Tsing Hua University, Taiwan, et al., 2016, 16 pages.

Ames, A. et al., "Control Barrier Functions: Theory and Applications," arXiv:1903.11199v1 [cs.SY], Mar. 27, 2019, 12 pages.

Von Rueden, L. et al., "Informed Machine Learning—A Taxonomy and Survey of Integrating Prior Knowledge into Learning Systems," IEEE Transactions on Knowledge and Data Engineering, May 28, 2021, 19 pages.

Seo, S., et al., "Physics-Aware Difference Graph Networks for Sparsely-Observed Dynamics," ICLR, 2020, 15 pages.

Jain, A., et al., "Recurrent Neural Networks for Driver Activity Anticipation via Sensory-Fusion Architecture," arXiv:1509.05016v1 [cs.CV], Sep. 16, 2015, 8 pages.

\* cited by examiner

ENHANCED TARGET DETECTION

BACKGROUND

Vehicles can be equipped with computing devices, networks, sensors and controllers to acquire data regarding the vehicle's environment and to operate the vehicle based on the data. Vehicle sensors can provide data concerning objects on a roadway, such as other vehicles. Operation of the vehicle can be based upon acquiring accurate and timely data regarding the objects while the vehicle is being operated on the roadway.

DETAILED DESCRIPTION

Figure 1:
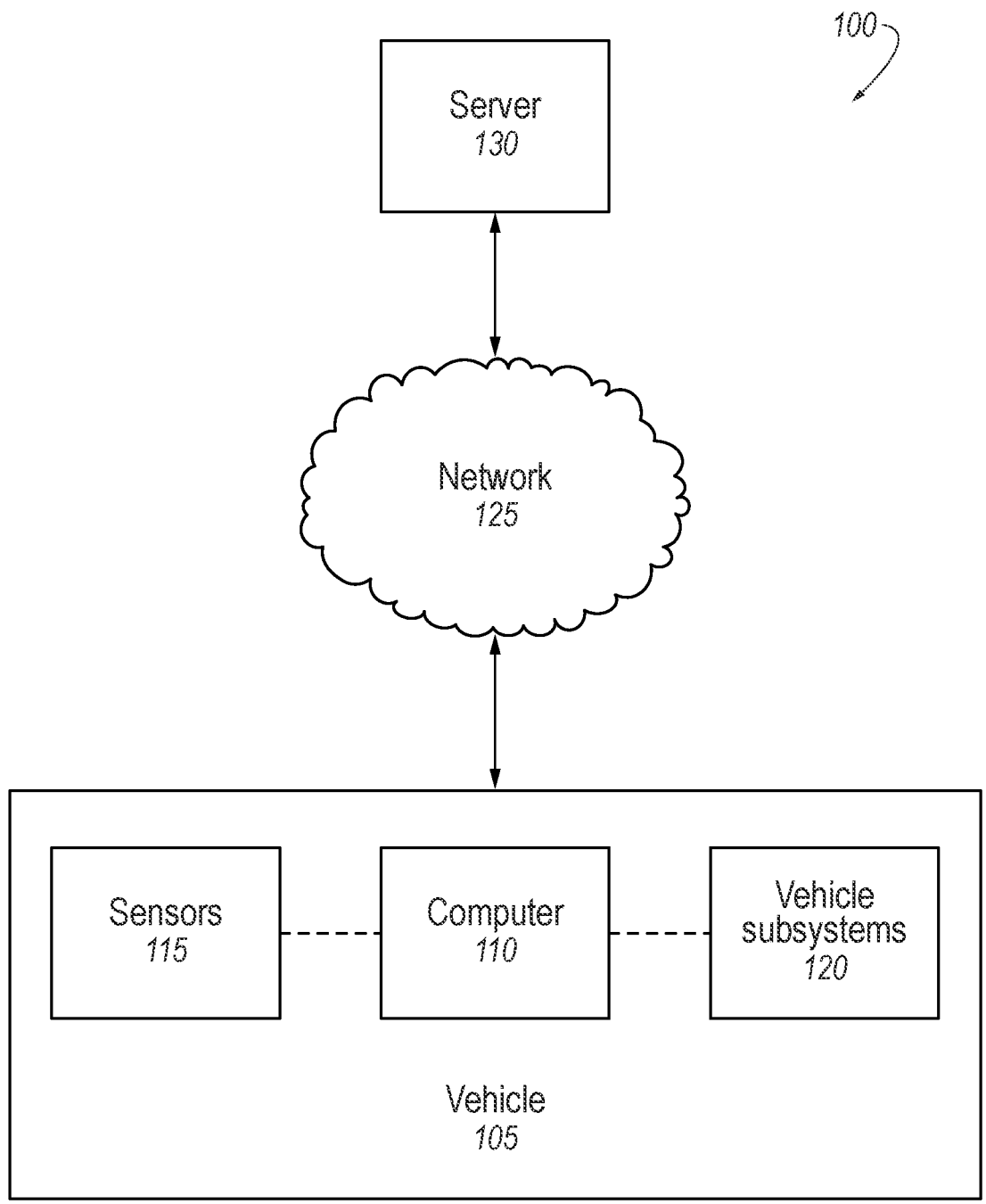
FIG. 1 is a block diagram of an example system to detect targets.

A computer of a host vehicle can perform threat assessment of target objects to determine whether the host vehicle will reach the target objects. Such threat assessments can incorporate machine learning algorithms to predict whether the target objects pose a threat to the host vehicle. Conventional machine learning algorithms may output a detection of a threat for a target object that may not be physically capable of reaching the host vehicle. For example, a target vehicle may be moving at a distance far enough from the host vehicle that a human operator would not consider the target vehicle a threat but a machine learning algorithm may output that the target is a threat Minimizing these false positive identifications of threats can improve operation of the computer, reducing overall computations and memory usage and reducing unnecessary actuation of subsystems to avoid the target object.

Incorporating real-world physics models to the threat assessment reduces false positive identifications of threats by increasing a loss function of the machine learning algorithm for unrealistic inputs. That is, when the machine learning program would identify a target as a threat, the real-world physics model increases the loss function beyond a threshold, and the machine learning program outputs the target as not a threat. The real-world physics models can be incorporated as additional terms to the loss function, accounting for real-world physical quantities such as distance, speed, acceleration, etc. Thus, the machine learning algorithms used for threat assessment can more accurately detect threats in realistic driving scenarios with the real-world physics models while reducing false positive detections compared to conventional machine learning algorithms.

Disclosed herein is a method including inputting image data to a machine learning program trained with a virtual boundary model based on a distance between a host vehicle and a target object and a loss function based on a real-world physical model, outputting, from the machine learning program, an identification of a threat object, and actuating a subsystem of the host vehicle based on the identification of the threat object. The loss function can include a distance term summing respective distances between the host vehicle and each of a plurality of targets. The distance term can increase when the respective distances between the host vehicle and each of the plurality of targets increase. The image data can be input to an image processing program to determine the respective distances between the host vehicle and each of the plurality of targets. The respective distances can be determined between the host vehicle and each of the plurality of targets based on collected sensor data. A threat number can be output from the machine learning program, the threat number indicating a likelihood of the host vehicle reaching the threat object, and actuating the subsystem based on the output threat number.

The virtual boundary model can be further based on an approach speed of the host vehicle to the target object. The image data can be input to the virtual boundary model, determining a difference the output of the machine learning program and an output of the virtual boundary model, and actuating the subsystem when the difference is below a difference threshold. The image data can be input to the virtual boundary model, to determine a difference the output of the machine learning program and an output of the virtual boundary model, and to actuate the subsystem when the difference is below a difference threshold. The machine learning program can be a recurrent neural network. The training of the machine learning program can include identifying the target object for threat assessment when the target object violates a constraint of the virtual boundary model. The machine learning program can be further trained with a training dataset of images including the host vehicle and annotations indicating whether one or more target objects are threat objects. The machine learning program can include a plurality of nodes arranged in layers. Training the machine learning program can include backpropagating a loss function in the machine learning program to determine weights and biases.

Further disclosed is a computer readable medium, storing program instructions for executing some or all of the above method steps. Further disclosed is a computer programmed for executing some or all of the above method steps, including a computer apparatus, programmed to input image data to a machine learning program trained with a virtual boundary model based on a distance between a host vehicle and a target object and a loss function based on a real-world physical model, output, from the machine learning program, an identification of a threat object, and actuate a subsystem of the host vehicle based on the identification of the threat object. The loss function can include a distance term summing respective distances between the host vehicle and each of a plurality of targets. The distance term can increase when the respective distances between the host vehicle and each of the plurality of targets increase. The image data can be input to an image processing program to determine the respective distances between the host vehicle and each of the plurality of targets. The respective distances can be determined between the host vehicle and each of the plurality of targets based on collected sensor data. A threat number can be output from the machine learning program, the threat number indicating a likelihood of the host vehicle reaching the threat object, and actuating the subsystem based on the output threat number.

The instructions can include further instructions to further base the virtual boundary model on an approach speed of the host vehicle to the target object. The image data can be input to the virtual boundary model, determining a difference the output of the machine learning program and an output of the virtual boundary model, and actuating the subsystem when the difference is below a difference threshold. The image data can be input to the virtual boundary model, to determine a difference the output of the machine learning program and an output of the virtual boundary model, and to actuate the subsystem when the difference is below a difference threshold. The machine learning program can be a recurrent neural network. The training of the machine learning program can include identifying the target object for threat assessment when the target object violates a constraint of the virtual boundary model. The machine learning program can be further trained with a training dataset of images including the host vehicle and annotations indicating whether one or more target objects are threat objects. The machine learning program can include a plurality of nodes arranged in layers. Training the machine learning program can include back-propagating a loss function in the machine learning program to determine weights and biases.

FIG. 1 is a block diagram of an example system 100 for operating a vehicle 105. A vehicle 105 may be any suitable type of ground vehicle 105, e.g., a passenger or commercial automobile such as a sedan, a coupe, a truck, a sport utility, a crossover, a van, a minivan, a taxi, a bus, etc.

The vehicle 105 includes a computer 110. The computer 110 includes a processor and a memory. The memory includes one or more forms of computer 110 readable media, and stores instructions executable by the vehicle computer 110 for performing various operations, including as disclosed herein. For example, the computer 110 can be a generic computer 110 with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 110.

The memory can be of any type, e.g., hard disk drives, solid state drives, servers 130, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110.

The computer 110 may include programming to operate one or more of vehicle 105 brakes, propulsion e.g., control of acceleration in the vehicle 105 by controlling one or more of an internal combustion engine, electric motor, hybrid engine, etc., steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle network such as a communications bus as described further below, more than one processor, e.g., included in components such as sensors 115, electronic control units (ECUs) or the like included in the vehicle 105 for monitoring and/or controlling various vehicle components, e.g., a powertrain controller, a brake controller, a steering controller, etc. The computer 110 is generally arranged for communications on a vehicle communication network that can include a bus in the vehicle 105 such as a controller area network CAN or the like, and/or other wired and/or wireless mechanisms. Alternatively or additionally, in cases where the computer 110 actually comprises a plurality of devices, the vehicle communication network may be used for communications between devices represented as the computer 110 in this disclosure. Further, as mentioned below, various controllers and/or sensors 115 may provide data to the computer 110 via the vehicle communication network.

Vehicles 105, such as autonomous or semi-autonomous vehicles 105, typically include a variety of sensors 115. A sensor 115 is a device that can obtain one or more measurements of one or more physical phenomena. Some sensors 115 detect internal states of the vehicle 105, for example, wheel speed, wheel orientation, and engine and transmission variables. Some sensors 115 detect the position or orientation of the vehicle 105, for example, global positioning system GPS sensors 115; accelerometers such as piezoelectric or microelectromechanical systems MEMS; gyroscopes such as rate, ring laser, or fiber-optic gyroscopes; inertial measurements units IMU; and magnetometers. Some sensors 115 detect the external world, for example, radar sensors 115, scanning laser range finders, light detection and ranging LIDAR devices, and image processing sensors 115 such as cameras. A LIDAR device detects distances to objects by emitting laser pulses and measuring the time of flight for the pulse to travel to the object and back. Some sensors 115 are communications devices, for example, vehicle-to-infrastructure V2I or vehicle-to-vehicle V2V devices.

Sensor 115 operation can be affected by obstructions, e.g., dust, snow, insects, etc. Often, but not necessarily, a sensor 115 includes a digital-to-analog converter to converted sensed analog data to a digital signal that can be provided to a digital computer 110, e.g., via a network. Sensors 115 can include a variety of devices, and can be disposed to sense and environment, provide data about a machine, etc., in a variety of ways. For example, a sensor 115 could be mounted to a stationary infrastructure element on, over, or near a road 210. Moreover, various controllers in a vehicle 105 may operate as sensors 115 to provide data via the vehicle 105 network or bus, e.g., data relating to vehicle 105 speed, acceleration, location, subsystem 120 and/or component status, etc. Further, other sensors 115, in or on a vehicle 105, stationary infrastructure element, etc., infrastructure could include cameras, short range radar, long range radar, LIDAR, and/or ultrasonic transducers, weight sensors 115, accelerometers, motion detectors, etc., i.e., sensors 115 to provide a variety of data. To provide just a few non-limiting examples, sensor 115 data could include data for determining a position of a component, a location of an object, a speed of an object, a type of an object, a slope of a roadway, a temperature, a presence or amount of moisture, a fuel level, a data rate, etc.

A vehicle subsystem 120 is a set of components or parts, including hardware components and typically also software and/or programming, to perform a function or set of operations in the vehicle 105. Vehicle subsystems 120 typically include, without limitation, a braking system, a propulsion system, and a steering system. The propulsion subsystem 120 converts energy to rotation of vehicle 105 wheels to propel the vehicle 105 forward and/or backward. The braking subsystem 120 can slow and/or stop vehicle 105 movement. The steering subsystem 120 can control a yaw, e.g., turning left and right, maintaining a straight path, of the vehicle 105 as it moves.

A computer 110 can be programmed to communicate with one or more remote sites such as a server 130, via a wide area network 125. The wide area network 125 can include one or more mechanisms by which a vehicle computer 110 may communicate with, for example, a remote server 130. Accordingly, the network can include one or more of various wired or wireless communication mechanisms, including any desired combination of wired e.g., cable and fiber and/or wireless e.g., cellular, wireless, satellite, microwave, and radio frequency communication mechanisms and any desired network topology or topologies when multiple communication mechanisms are utilized. Exemplary communication networks include wireless communication networks e.g., using Bluetooth, Bluetooth Low Energy BLE, IEEE 802.11, vehicle-to-vehicle V2V or vehicle 105 to everything V2X such as cellular V2X CV2X, Dedicated Short Range Communications DSRC, etc., local area networks LAN and/or wide area networks 125 WAN, including the Internet, providing data communication services.

Figure 2:
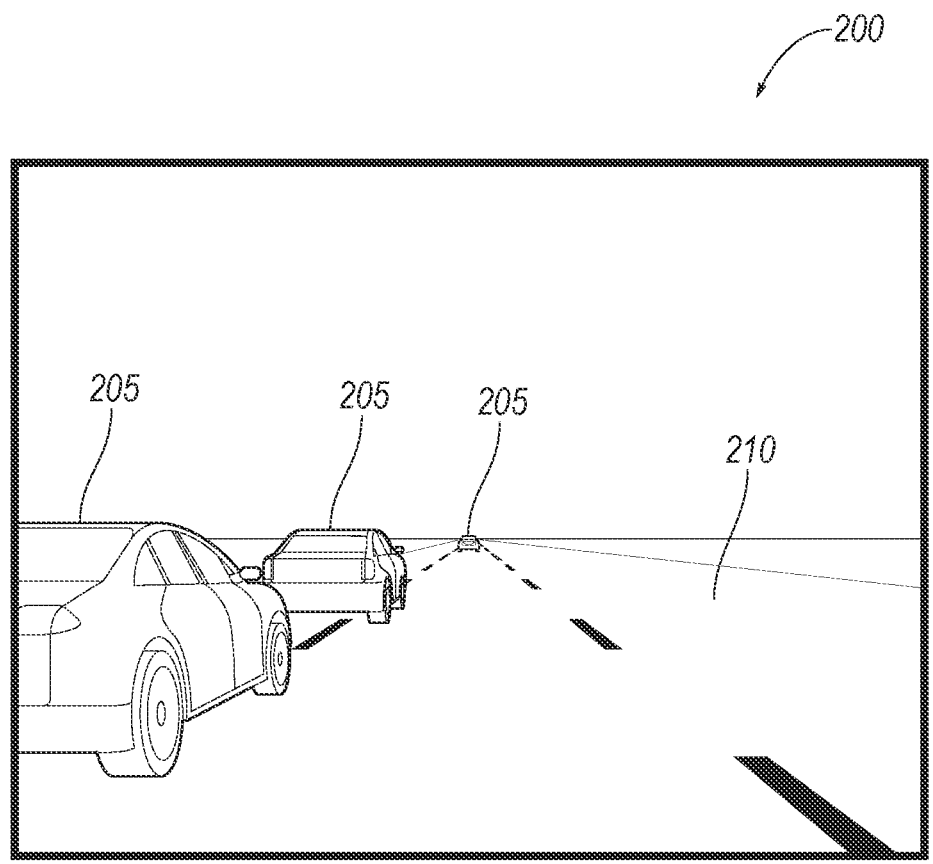
FIG. 2 is an example image collected by a host vehicle including targets.

FIG. 2 is an example image 200 of a plurality of target objects 205, e.g., target vehicles 205, on a road 210. A road 210 herein, unless specified otherwise, means any ground surface designated for travel of a vehicle 105. Typically, a road 210 includes a prepared travel surface, e.g., graded dirt, asphalt, gravel, etc. Further, a road 210 typically includes markings, e.g., paint, embedded markers, etc. to guide vehicle travel, e.g., in one or more lanes. A road 210 can include more than one lane for vehicle travel; each lane can be designated for travel in a specified direction. In some examples, a first road 210 can cross or merge with a second road 210, thereby forming an intersection.

The image 200 can include one or more target objects 205, as described above. In this context, a "target" is an object that has a possibility of interacting with the host vehicle 105. For example, the target 205 can be another vehicle 105, a roadway sign, a traffic barrier, etc. The image 200 can be one image 200 in a set of image data that includes a plurality of images 200. The computer 110 can collect the image 200 data with one or more image sensors 115. The image sensors 115 can be cameras and can detect electromagnetic radiation in some range of wavelengths. For example, the image sensors 115 may detect visible light, infrared radiation, ultraviolet light, or some range of wavelengths including visible, infrared, and/or ultraviolet light. For example, the camera can be a charge-coupled device CCD, complementary metal oxide semiconductor CMOS, or any other suitable type. For another example, the image sensors 115 may be a time-of-flight TOF cameras, which include a modulated light source for illuminating the environment and detect both reflected light from the modulated light source and ambient light to sense reflectivity amplitudes and distances to the scene.

The computer 110 can input the image data to a machine learning program, such as a recurrent neural network 300 or other deep neural network 300. The machine learning program provides an output, e.g., a determination of whether a target 205 is a threat, a likelihood that the target 205 will reach the host vehicle 105, etc. The output can be a numerical value from a node or neuron of the neural network 300, as described below, e.g., a value between 0 and 1 indicating the likelihood that the target 205 will reach the host vehicle 105. The machine learning program can be trained with a virtual boundary model. In this context, a "virtual boundary model" is a model describing a boundary beyond which the host vehicle 105 should not cross in order to avoid the targets 205. A "model" in this context is a set of one or more mathematical equations or expressions provided to evaluate data. The virtual boundary model in this example and shown in Expression (1) below describes a line in a two-dimensional map of the road 210. For example, a boundary can be a line that corresponds to a minimum distance to be maintained between a vehicle in the same lane and the host vehicle 105. Another example of a boundary is a line that corresponds to minimum distances to be maintained between vehicles in an adjacent lane and host vehicle 105 as vehicle 105 executes a passing maneuver.

The virtual boundary model can include a term that is based on a distance between a host vehicle 105 and a target object 205. The virtual boundary model can further include a term based on an approach speed of the host vehicle 105 to the target object 205, as shown in the Expression below:

$$\dot{h}(x(t),u(t))+\lambda h(x(t)) \geq 0 \tag{1}$$

where h(x(t)) is a term of the virtual boundary model based on the distance x(t) between the host vehicle 105 and the target object 205 at a time t, ḣ(x(t), u(t)) is a term of the virtual boundary model based on distance x(t) and a speed of approach u(t) of the target object 205 at the time t, and 2 is a tunable parameter determined during empirical and/or virtual testing of vehicles 105 and targets 205 such that targets 205 that should not be identified as threats satisfy the Expression, and targets 205 that should be identified as threats violate the Expression. Evaluating the virtual boundary model at a particular time t for a particular distance x and approach speed u of a target 205 in an image 200 is an "output" of the virtual boundary model. The computer 110 can evaluate the output of the virtual boundary model for the target 205.

During training of the machine learning program, the computer 110 and/or the server 130 can validate the machine learning program with the virtual boundary model. The computer 110 and/or the server 130 can input the image 200 data to the virtual boundary model and determine a difference the output of the machine learning program and an output of the virtual boundary model. That is, the machine learning program can output a prediction corresponding to a likelihood that the target 205 is a threat, and the virtual boundary model can output whether the target 205 has crossed the line defined by the Expression above and that the computer 110 should perform avoidance and/or mitigation countermeasures. Based on these two outputs, the computer 110 and/or the server 130 can adjust weights and biases of the machine learning program to reduce the difference between outputs of the virtual boundary model and the machine learning program and thereby train the machine learning program to output predictions that more closely correspond to outputs from the virtual boundary model.

The virtual boundary model can include one or more constraints. A "constraint" in this context is a threshold value that defines a boundary of the virtual boundary model. That is, the constraints can incorporate real-world, i.e., ground truth, restrictions on movement of the host vehicle 105 and the target objects 205. For example, a constraint on the virtual boundary model described above is the 0 (zero) shown in Expression (1) above, i.e., the virtual boundary model is the boundary for which Expression (1) evaluates to greater than or equal to 0. The training of the machine learning program can includes identifying the target object 205 for threat assessment when the target object 205 violates a constraint of the virtual boundary model. The target object 205 "violates" the constraint when the output of the virtual boundary model, described above, changes the value of the constraint to false, e.g., when the output value of the Expression above is below 0 for a specific target object 205, the target object "violates" the constraint. This corresponds to the host vehicle 105 reaching or crossing over a boundary line as defined above. When one of the constraints of the virtual boundary model is violated, the computer 110 can identify the target object 205 that violated the constraint as a potential threat and perform a threat assessment, as described below, for the target object 205.

The machine learning program can include a loss function. In this context, a "loss function" is an equation that determines a difference between output from the machine learning program and an expected output based on ground-truth training data. That is, the loss function encodes a difference of the output from the ground-truth training data. Adjusting the machine learning program to minimize the loss function improves the likelihood that the machine learning program would provide outputs that are accurate to the ground-truth data.

The loss function is based on a real-world physical model, i.e., a model describing a real-world physical arrangement of objects. The real-world physical model can include, one or more physics equations, e.g., equations based on Newtonian mechanics, describing the real-world physical arrangement. For example, the real-world physical model can include a Euclidean distance equation describing a distance between the host vehicle 105 and the target object 205. The loss function can include a distance term summing respective real-world, physical distances between the host vehicle 105 and each of a plurality of targets 205. The distance term can increase when the respective distances between the host vehicle 105 and each of the plurality of targets 205 increase, increasing the loss function. An example loss function L is shown in the Expressions below:

$$L(a_t) = L_p(a_t) + L_n(a_t) + \lambda L_m(a_t) \quad (2)$$

$$L_p(a_t) = \sum_t -e^{-max(0,y-t)} \log(a_t^0) \quad (3)$$

$$L_n(a_t) = \sum_t -\log(a_t^1) \quad (4)$$

$$L_m = \sum_i^n dist(\text{host vehicle}, target_i) \quad (5)$$

where $a_t$ is a set of input vectors representing images converted into a format that can be input to the machine learning program, $L_p$ is an exponential loss term, y is the prediction output from the machine learning program corresponding to a probability that the input data includes a threat, $a_t^0$ is a first element of each input vector in the set $a_t$, $L_n$ is a softmax cross entropy loss term, $a_t^1$ is a second element of each input vector in the set $a_t$, $L_m$ is a term based on the real-world physical model, $\lambda$ is the tunable parameter described above, and dist( ) is the real-world physical model, in this example, a measured or detected real-world distance between the host vehicle 105 and the ith of n targets 205, where i is a natural number index and n is a total number of targets 205. Alternatively, the $L_m$ term can be based on the virtual boundary model described above because the virtual boundary model incorporates the distance term x(t) and the approach speed u(t), which incorporate one or more physics equations into the evaluation of Expression (1) above. The exponential loss term $L_p$ can be optimized in a recurrent neural network to learn features in image data in which one of the target objects 205 is a threat object, as described below. The entropy loss term $L_n$ can be optimized in the recurrent neural network to learn features in image data in which no targets objects 205 are threat objects.

To determine the distance between the host vehicle 105 and a target 205, the computer 110 and/or the server 130 can input the image 200 to an image processing program that determines the distance. A conventional image processing program can determine a distance of the object in an image 200 from the image sensor 115 collecting the image 200 based on a focal length of the image sensor 115, stored in the memory, and the resolution of the image 200 in pixels. That is, the focal length of the image sensor 115, i.e., the distance from a lens of the sensor 115 to its focal point, determines an amount of light that reaches the image sensor 115, such that the number of pixels that an object covers in an image 200 is based on the focal length. Thus, the computer 110 and/or the server 130 can determine distances to objects in the image 200 based on the focal length. Alternatively or additionally, the computer 110 and/or the server 130 can determine the respective distances between the host vehicle 105 and each of the plurality of targets 205 based on collected sensor 115 data, e.g., radar data, lidar data, etc. That is, certain sensors 115 such as radar and lidar can directly measure distances between the host vehicle 105 and each object in the image 200, and the detected distances can be included as inputs to the machine learning program.

The machine learning program can be trained with a training dataset of images 200. The training dataset can include ground-truth data, i.e., data including real-world objects and host vehicles 105. Images 200 in the training dataset can include annotations indicating whether one or more target objects 205 in the images 200 are threat objects. The computer 110 and/or server 130 can determine the loss function based on the annotations in the training images 200 and the outputs from the machine learning program.

After training the machine learning program, the computer 110 implementing the machine learning program can compare the output from the machine learning program to output from the virtual boundary model described above. For example, the machine learning program can output a value that corresponds to a high probability that a second vehicle traveling in the same lane as the host vehicle 105 is a threat. The virtual boundary model, based on inputs that determine that the second vehicle is traveling at the same speed and direction as the host vehicle 105, can determine that the host vehicle 105 will not reach the boundary between the second vehicle and the host vehicle 105 and therefore the second vehicle does correspond to a threat.

Because the virtual boundary model incorporates real-world physical quantities, such as the distance x(t) and the approach speed u(t), the difference between the outputs can encode a deviation of the output from the machine learning model from the realistic outputs from the virtual boundary model. Thus, the computer 110 can use the difference between the outputs of the machine learning program and the virtual boundary model as a benchmark by which the computer 110 determines whether the output of the machine learning program is reliable. That is, the virtual boundary model can serve as a final check on the output of the machine learning program, and the computer 110 can actuate one or more components based on the output of the machine learning program when a difference between the output of the machine learning program and the output of the virtual boundary model is below a threshold. The threshold can be determined based on empirical and/or virtual testing of test vehicles 105 and test targets 205 in specified driving scenarios and/or duty cycles.

When the machine learning program is trained, the weights and biases that are applied at each node, as described below, can be adjusted until the loss function is minimized Because the loss function is based on the real-world physical model, outputs from the machine learning program that could violate physical reality can increase the value of the loss function. Minimizing the cost function thus could reduce such unrealistic outputs. The computer 110 can perform a threat assessment for one or more target objects 205 identified by the machine learning program as a threat object. In this context, a "threat object" is a target object 205 identified in the image 200 that may reach the host vehicle 105. The machine learning program can output an identification of the threat object in the image 200. For example, the machine learning program can output a threat number, as described below, upon identifying the threat object. A threat number is a prediction of whether a specific target 205 will intersect or reach the host vehicle 105. Specifically, the machine learning program can output an acceleration threat number ATN, a brake threat number BTN, and a steering threat number STN for the host vehicle 105 and the target 205, and based on the threat numbers ATN, BTN, STN, which may be combined into a single threat number TN, to actuate subsystems 120. In one non-limiting example, the BTN, STN, and ATN can be determined in a manner described further below. That is, the computer 110 can determine one of a deceleration to slow or stop the host vehicle 105 prior to reaching the target 205, a lateral acceleration to steer the host vehicle 105 away from the target 205, or an acceleration to propel the host vehicle 105 past the target 205.

The BTN is a measure of a needed longitudinal deceleration to allow the host vehicle 105 to stop before reaching the target 205. The BTN can be based on a host vehicle speed, a distance between the target 205 and the host vehicle 105, and the respective projected trajectories of the target 205 and the host vehicle 105. The machine learning program can determine a longitudinal deceleration to stop the host vehicle 105 before reaching the target 205, e.g., 2 m/s$^2$. The machine learning program can determine a maximum deceleration of the host vehicle 105, e.g., 8 m/s$^2$. The BTN can be the ratio of the needed deceleration to the maximum deceleration, e.g., BTN=2/8=0.25. The needed deceleration can be a zero-range deceleration, i.e., a deceleration determined by a path-planning algorithm to stop the host vehicle 105 at a specified point to avoid reaching the target 205. If the needed deceleration to avoid reaching the target 205 exceeds the maximum deceleration of the host vehicle 105, i.e., BTN>1, then the machine learning program can set the value of the BTN to 1, i.e., if BTN>1,BTN=1.

The STN is a measure of a needed lateral acceleration to allow the host vehicle 105 to steer away from the target 205. For example, the STN can be a measure of the lateral acceleration to steer the host vehicle 105 away from the target 205 in a direction opposite to a direction of travel of the host vehicle 105. That is, when the host vehicle 105 is in a left-hand turn, the STN is based on the lateral acceleration to steer the host vehicle 105 to the right, away from the target 205. As with the BTN, the machine learning program can determine a needed lateral acceleration to avoid the host vehicle 105 reaching the target 205. The STN can be the ratio of the needed lateral acceleration to a maximum lateral acceleration of the host vehicle 105. If the needed lateral acceleration exceeds the maximum lateral acceleration, the machine learning program can set the STN to 1.

The ATN is a measure of a needed longitudinal acceleration to allow the host vehicle 105 to accelerate and pass the target 205. As described above for the BTN and the STN, the machine learning program can determine a needed acceleration to allow the host vehicle 105 to pass the target 205 and a maximum available acceleration of the host vehicle 105 as specified by a manufacturer. The ATN can be the ratio of the needed longitudinal acceleration to the maximum longitudinal acceleration of the host vehicle 105. If the needed longitudinal acceleration exceeds a maximum longitudinal acceleration, the machine learning program can set the ATN to 1. The machine learning program may determine the STN, BTN, and/or ATN to produce a respective overall threat number TN for the target 205.

The computer 110 can actuate one or more vehicle subsystems 120 based on the threat number TN, e.g., when the threat number TN is above a predetermined threat number threshold. The computer 110 can actuate one or more subsystems 120 based on a comparison of the threat number to a plurality of thresholds. The thresholds can be determined as, e.g., specifications from a manufacturer, results of simulation testing of virtual host vehicle 105 and virtual target 205 trajectories, empirical testing of vehicle subsystems 120 of the host vehicle 105 during a collision test, etc. For example, if the threat number TN is above 0.7, the computer 110 can actuate a brake 120 to decelerate the host vehicle 105, e.g., at −6.5 meters per second squared (m/s$^2$). In another example, if the threat number TN is above 0.4 but less than or equal to 0.7, the computer 110 can actuate the brake 120 to, e.g., a deceleration of −2.0 m/s$^2$. In another example, if the threat number TN is greater than 0.2 but less than or equal to 0.4, the computer 110 can display a visual warning on a host vehicle 105 human-machine interface and/or play an audio warning over a speaker. In yet another example, the computer 110 can actuate a steering motor 120 to steer the host vehicle 105 away from the targets 200 at the lateral acceleration described above. In yet another example, the computer 110 can actuate a propulsion 120 to accelerate the host vehicle 105 along the road 210 at the needed acceleration described above.

Figure 3:
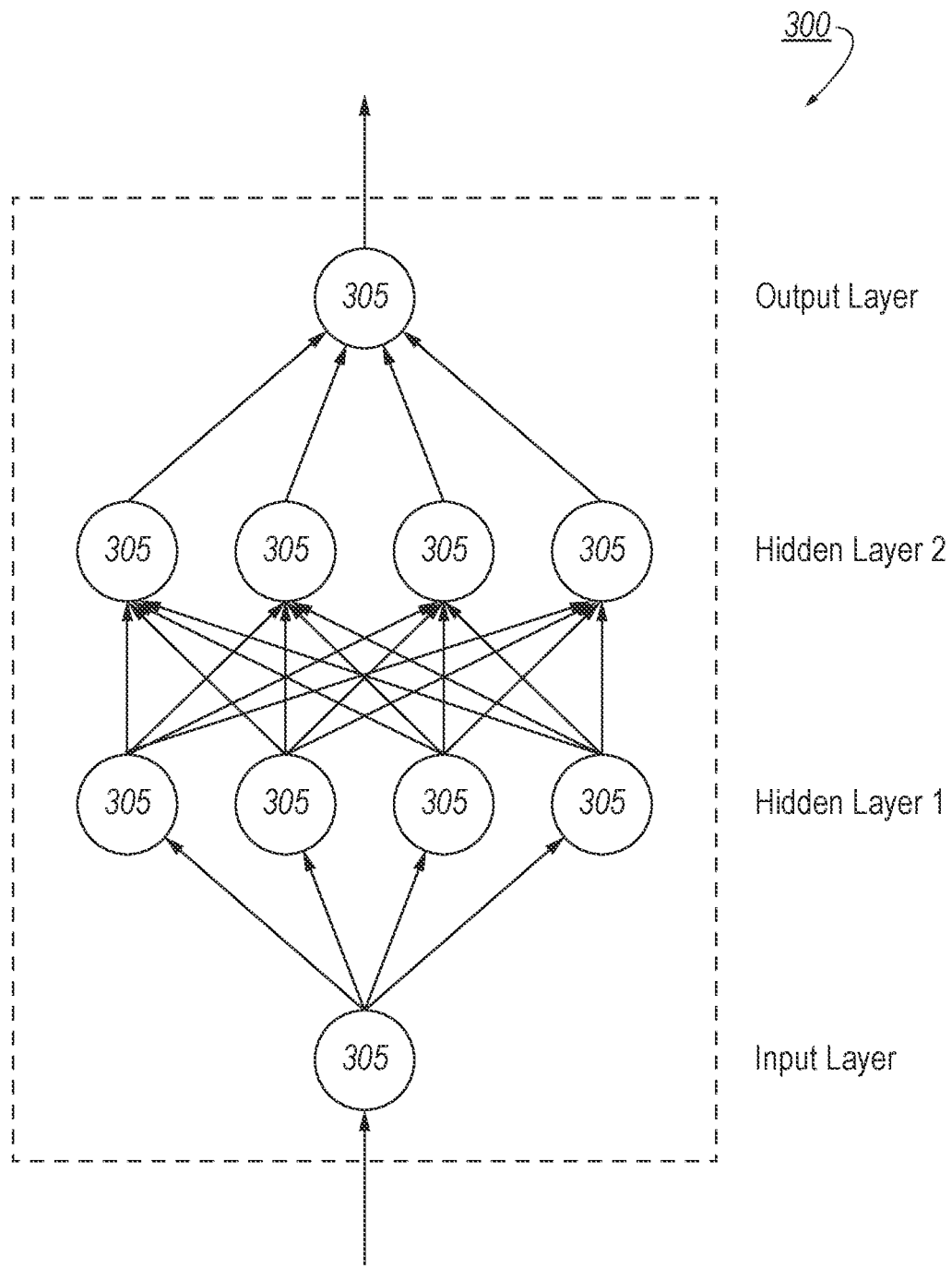
FIG. 3 is a block diagram of an example machine learning program.

FIG. 3 is a block diagram of an example deep neural network 300 (DNN). The machine learning program trained to output a detection of a threat object, as described above, can be a DNN 300. A DNN 300 can be a software program that can be loaded in memory and executed by a processor included in a computer 110, for example. In an example implementation, the DNN 300 can include, but is not limited to, a convolutional neural network CNN, a recurrent neural network RNN, R-CNN Region-based CNN, Fast R-CNN, and Faster R-CNN. The DNN 300 includes multiple nodes or neurons 305. The neurons 305 are arranged so that the DNN 300 includes an input layer, one or more hidden layers, and an output layer. Each layer of the DNN 300 can include a plurality of neurons 305. While three hidden layers are illustrated, it is understood that the DNN 300 can include additional or fewer hidden layers. The input and output layers may also include more than one node.

As one example, the DNN 300 can be trained with ground truth data, i.e., data about a real-world condition or state. For example, the DNN 300 can be trained with ground truth data and/or updated with additional data. Weights can be initialized by using a Gaussian distribution, for example, and a bias for each node can be set to zero. Training the DNN 300 can include updating weights and biases via suitable techniques such as backpropagation with optimizations. Backpropagation is a technique for inputting a loss function based on the output of the DNN 300 combined with ground truth data to the layers of the DNN 300 from back to from, i.e., from the layers closest to the output to the layers closes to the input. Backpropagation adjusts the weights and biases of the layers of a DNN 300 based on minimizing the loss function. Ground truth data, or "ground truth," means data deemed to represent a real-world environment, e.g., conditions and/or objects in the environment. Thus, ground truth data can include sensor data depicting an environment, e.g., an object in an environment, along with a label or labels describing the environment, e.g., a label describing the object. Ground truth data can further include or be specified by metadata such as a location or locations at which the ground truth data was obtained, a time of obtaining the ground truth data, etc.

The nodes are sometimes referred to as artificial neurons 305, because they are designed to emulate biological, e.g., human, neurons 305. A set of inputs represented by the arrows to each neuron 305 are each multiplied by respective weights. The weighted inputs can then be summed in an input function to provide, possibly adjusted by a bias, a net input. The net input can then be provided to an activation function, which in turn provides a connected neuron 305 an output. The activation function can be a variety of suitable functions, typically selected based on empirical analysis. As illustrated by the arrows in the figure, neuron 305 outputs can then be provided for inclusion in a set of inputs to one or more neurons 305 in a next layer.

Figure 4:
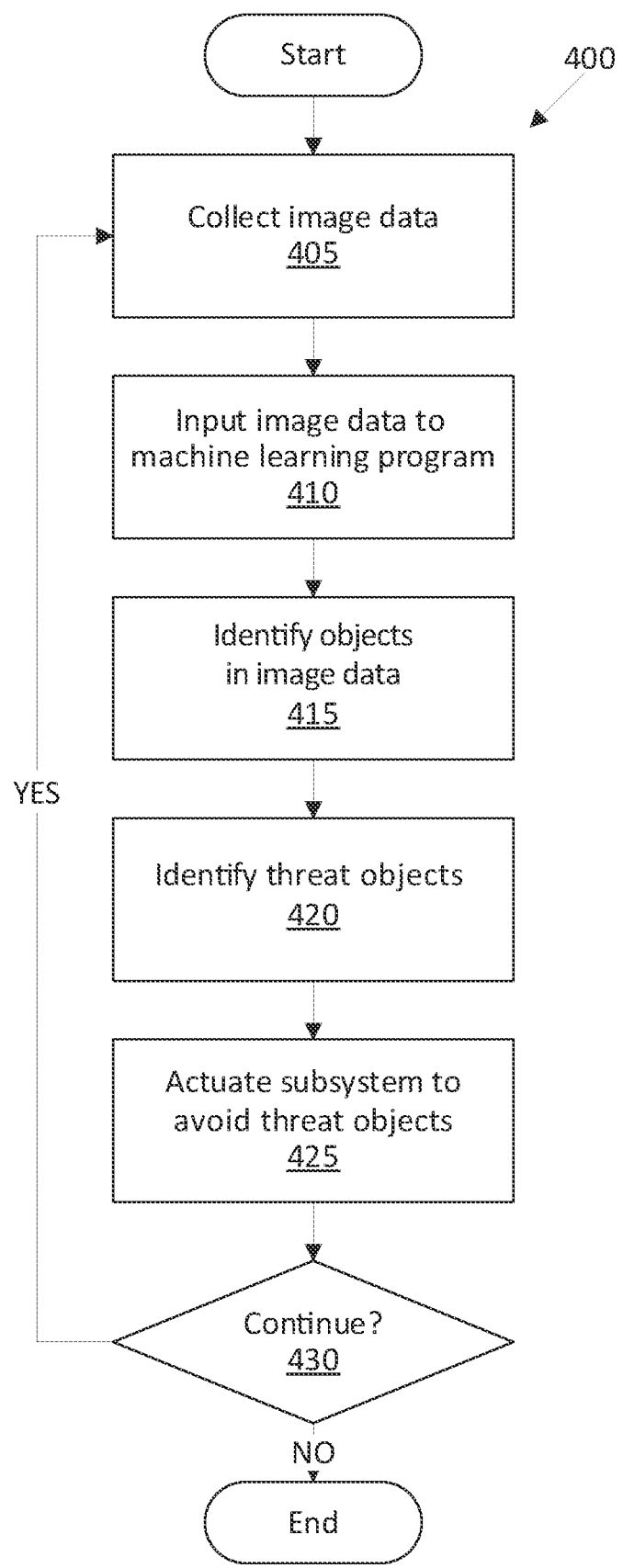
FIG. 4 is a block diagram of an example process for detecting targets.

FIG. 4 is a block diagram of an example process 400 for identifying threats. The process 400 begins in a block 405, in which an image sensor 115 of a host vehicle 105 collects image data. A computer 110 of the host vehicle 105 can actuate the image sensor 115 to collect one or more images 200 of a road 210, as described above.

Next, in a block 410, the computer 110 inputs the image 200 data to a machine learning program trained to output threat objects in the image 200 data. As described above, the machine learning program can include a loss function based on a real-world physical model to output realistic threat objects.

Next, in a block 415, the computer 110 identifies one or more objects in the image 200 data. The machine learning program can be trained to identify the objects on the road 210 that may interact with the host vehicle 105. As described above, the machine learning program can be trained with a training dataset with annotated targets 205.

Next, in a block 420, the machine learning program outputs one or more threat objects. The output can be an identification of an object that may interact with the host vehicle 105 and a threat number assigned to the object. The threat number is a likelihood of the host vehicle 105 reaching the threat object.

Next, in a block 425, the computer 110 actuates one or more subsystems 120 to avoid the threat objects. The computer 110 can actuate the subsystems 120 based on the type of threat number. For example, when the output from the machine learning program is a brake threat number, the computer 110 can actuate a brake to avoid the threat objects.

Next, in a block 430, the computer 110 determines whether to continue the process 400. For example, the computer 110 can determine to continue when the host vehicle 105 is still moving along the road 210. If the computer 110 determines to continue, the process 400 returns to the block 405. Otherwise, the process 400 ends.

Figure 5:
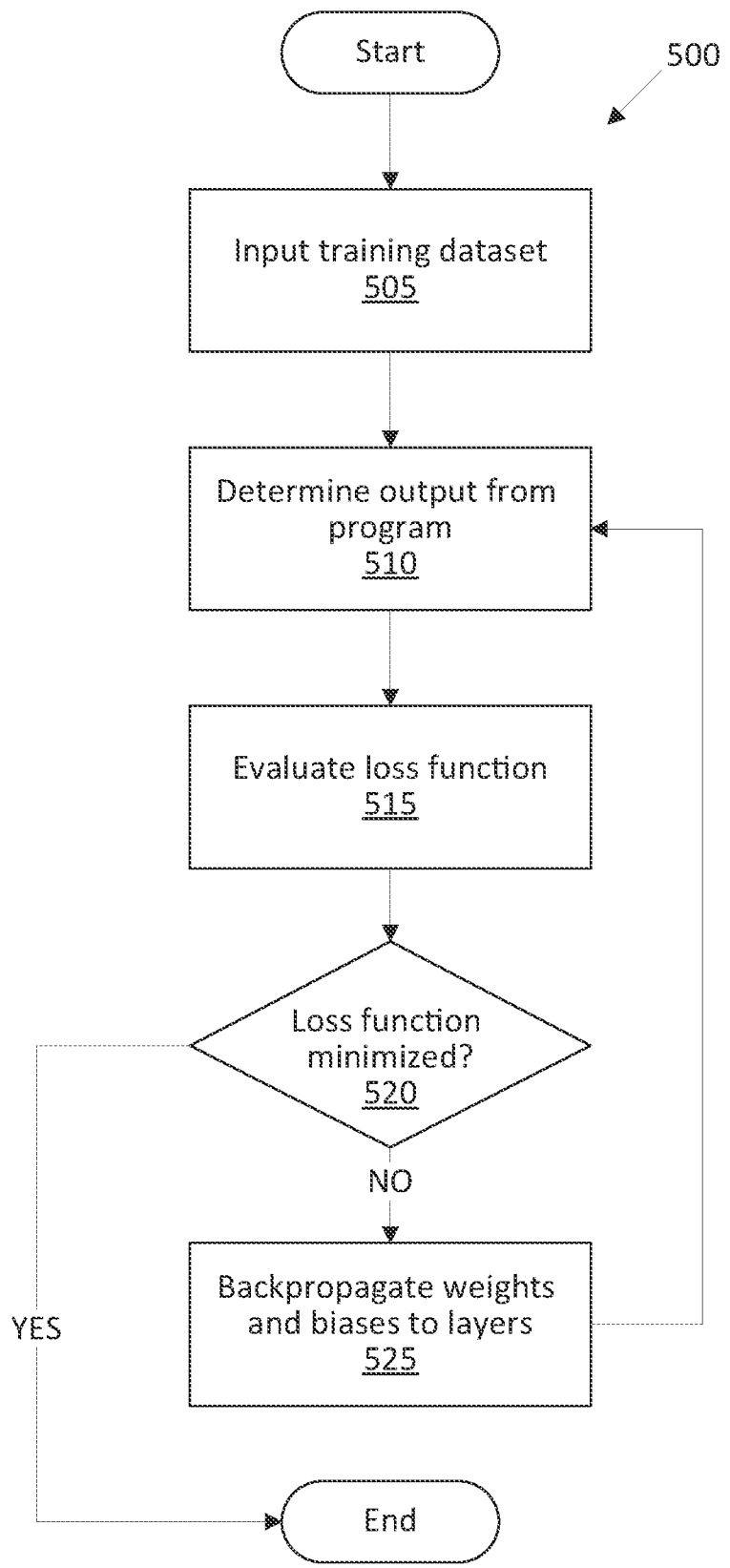
FIG. 5 is a block diagram of an example process for training the machine learning program.

FIG. 5 is a block diagram of an example process 500 for training a machine learning program to detect targets 205 that are threat objects. The process 500 begins in a block 505, in which a computer 110 and/or a server 130 inputs a training dataset of images to the machine learning program. As described above, the training dataset is a set of images 200 with ground-truth data, i.e., data including real-world objects and host vehicles 105. Images 200 in the training dataset can include annotations indicating whether one or more target objects 205 in the images 200 are threat objects.

Next, in a block 510, the computer 110 and/or server 130 determines an output from the machine learning program. As described above, the images 200 can pass through one or more layers with one or more neurons 305 in a neural network 300. The neural network 300 outputs whether the images 200 include one or more threat objects, i.e., targets 205 that may reach the host vehicle 105.

Next, in a block 515, the computer 110 and/or server 130 evaluates a loss function based on the output of the machine learning program. As described above, the loss function incorporates a real-world physical model that increases the evaluation of the loss function based one or more real-world physics equations. For example, the loss function can include a distance term that increases as the distance between the host vehicle 105 and one of the targets 205 increases. In another example, the loss function can incorporate a virtual boundary model that outputs whether one of the targets 205 is a threat based on a distance and an approach speed of the target 205 to a virtual boundary.

Next, in a block 520, the computer 110 and/or server 130 determines whether the loss function is minimized. As described above, minimizing the loss function according to a conventional technique such as gradient descent reduces differences between the output of the machine learning program and the ground truth data in the training dataset. The computer 110 and/or server 130 can determine that the loss function is minimized when consecutive outputs from the loss function change by less than a threshold, i.e., the loss function reaches a local minimum. If the computer 110 and/or server 130 determines that the loss function is minimized, the process 500 ends. Otherwise, the process 500 continues in a block 525.

In the block 525, the computer 110 and/or server 130 backpropagates weights and biases to layers of the machine learning program based on the loss function. As described above, coefficients of the neurons 305 of layers of the neural network 300 can be adjusted from a final layer and propagate back through each subsequent layer of the neural network 300. The process 500 then returns to the block 510 to determine the output from the machine learning program with the new weights and biases.

Computer executable instructions may be compiled or interpreted from computer programs created using a variety of programming languages and/or technologies, including, without limitation, and either alone or in combination, Java, C, C++, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer 110 readable medium, such as a storage medium, a random access memory, etc. A computer 110 readable medium includes any medium that participates in providing data e.g., instructions, which may be read by a computer 110. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer 110. Common forms of computer-readable media include, for example, RAM, a PROM, an EPROM, a FLASH-EEPROM, any other memory chip or cartridge, or any other medium from which a computer 110 can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claimed invention.

Use of in response to, based on, and upon determining herein indicates a causal relationship, not merely a temporal relationship.

The invention claimed is:

1. A system, comprising a computer including a processor and a memory, the memory storing instructions executable by the processor to:
   input image data to a machine learning program trained with a virtual boundary model based on a distance between a host vehicle and a target object and a loss function based on a real-world physical model, wherein the loss function includes a distance term summing respective distances between the host vehicle and each of a plurality of targets;
   output, from the machine learning program, an identification of a threat object; and
   actuate a subsystem of the host vehicle based on the identification of the threat object.

2. The system of claim 1, wherein the distance term increases when the respective distances between the host vehicle and each of the plurality of targets increase.

3. The system of claim 1, wherein the instructions further include instructions to input the image data to an image processing program to determine the respective distances between the host vehicle and each of the plurality of targets.

4. The system of claim 1, wherein the instructions further include instructions to determine the respective distances between the host vehicle and each of the plurality of targets based on collected sensor data.

5. The system of claim 1, wherein the instructions further include instructions to output a threat number from the machine learning program, the threat number indicating a likelihood of the host vehicle reaching the threat object, and to actuate the subsystem based on the output threat number.

6. The system of claim 5, wherein the threat number is one of a brake threat number, a steering threat number, or an acceleration threat number.

7. The system of claim 1, wherein the virtual boundary model is further based on an approach speed of the host vehicle to the target object.

8. The system of claim 1, wherein the instructions further include instructions to input the image data to the virtual boundary model, to determine a difference between the output of the machine learning program and an output of the virtual boundary model, and to actuate the subsystem when the difference is below a difference threshold.

9. The system of claim 1, wherein the machine learning program is a recurrent neural network.

10. The system of claim 1, wherein the training of the machine learning program includes identifying the target object for threat assessment when the target object violates a constraint of the virtual boundary model.

11. The system of claim 1, wherein the machine learning program is further trained with a training dataset of images including the host vehicle and annotations indicating whether one or more target objects are threat objects.

12. A method, comprising:
   inputting image data to a machine learning program trained with a virtual boundary model based on a distance between a host vehicle and a target object and a loss function based on a real-world physical model, wherein the loss function includes a distance term summing respective distances between the host vehicle and each of a plurality of targets;
   outputting, from the machine learning program, an identification of a threat object; and
   actuating a subsystem of the host vehicle based on the identification of the threat object.

13. The method of claim 12, wherein the distance term increases when the respective distances between the host vehicle and each of the plurality of targets increase.

14. The method of claim 12, further comprising inputting the image data to an image processing program to determine the respective distances between the host vehicle and each of the plurality of targets.

15. The method of claim 12, further comprising determining the respective distances between the host vehicle and each of the plurality of targets based on collected sensor data.

16. The method of claim 12, further comprising outputting a threat number from the machine learning program, the threat number indicating a likelihood of the host vehicle reaching the threat object, and actuating the subsystem based on the output threat number.

17. The method of claim 16, wherein the threat number is one of a brake threat number, a steering threat number, or an acceleration threat number.

18. The method of claim 12, wherein the virtual boundary model is further based on an approach speed of the host vehicle to the target object.

19. The method of claim 12, further comprising inputting the image data to the virtual boundary model, determining a difference between the output of the machine learning program and an output of the virtual boundary model, and actuating the subsystem when the difference is below a difference threshold.

20. The method of claim 12, wherein the machine learning program is a recurrent neural network.

* * * * *